(12) United States Patent
Al-Mahdawi

(10) Patent No.: US 11,520,001 B1
(45) Date of Patent: Dec. 6, 2022

(54) ASSET LOCATION USING BACKSCATTER COMMUNICATION WITH LOW PROBABILITY OF INTERCEPT AND DETECTION

(71) Applicant: BAE Systems Information and Electronic Systems Integration Inc., Nashua, NH (US)

(72) Inventor: Tareef I. Al-Mahdawi, Escondido, CA (US)

(73) Assignee: BAE Systems Information and Electronic Systems Integrations Inc., Nashua, NH (US)

( * ) Notice: Subject to any disclaimer, the term of this patent is extended or adjusted under 35 U.S.C. 154(b) by 135 days.

(21) Appl. No.: 17/107,333

(22) Filed: Nov. 30, 2020

(51) Int. Cl.
  *H04B 1/00* (2006.01)
  *G01S 5/06* (2006.01)
  *H04B 1/69* (2011.01)
  *H04L 27/18* (2006.01)

(52) U.S. Cl.
  CPC .............. *G01S 5/06* (2013.01); *H04B 1/69* (2013.01); *H04L 27/18* (2013.01); *H04B 2001/6912* (2013.01)

(58) Field of Classification Search
  CPC ..... H04L 63/029; H04L 61/6081; H04N 4/33; H04N 8/005; G01C 21/28; H04W 12/06; H04W 12/47; H04W 4/029; G01S 13/751; G01S 5/10; H04B 1/707; H04B 1/0715; H04B 7/18539
  USPC ................................ 375/139, 341; 340/10.1
  See application file for complete search history.

(56) References Cited

U.S. PATENT DOCUMENTS

| 6,611,224 | B1 | 8/2003 | Nysen et al. |
| 8,773,243 | B1 | 7/2014 | van Niekerk et al. |
| 10,338,205 | B2* | 7/2019 | Zhang ..................... G01S 13/00 |
| 2005/0141594 | A1* | 6/2005 | Smith .................... H04B 1/713 |
| | | | 375/E1.033 |

(Continued)

OTHER PUBLICATIONS

Chenyang Li, et al., "Review on UHF RFID Localization Methods", IEEE Journal on RFID, vol. 3, No. 4, Dec. 2019.

(Continued)

*Primary Examiner* — Khai Tran
(74) *Attorney, Agent, or Firm* — Finch & Maloney PLLC; Scott J. Asmus

(57) ABSTRACT

Techniques are provided for asset location using backscatter communication. A methodology according to an embodiment includes receiving a signal, generated by a tag associated with an asset in response to a broadcast signal. The broadcast signal comprising a base code sequence, and the received signal comprising the broadcast signal modulated by a tag code sequence and shifted in frequency by a frequency offset. The methodology further includes translating the received signal by the frequency offset to generate a translated received signal, demodulating the translated received signal to remove the tag code sequence modulation to generate a demodulated received signal, cross-correlating the base code sequence with the demodulated received signal to generate a correlation signal, and determining a range to the asset based on a time delay associated with a peak of the correlation signal. The tag may be located based on the range and an estimated direction to the tag.

15 Claims, 8 Drawing Sheets

(56) References Cited

U.S. PATENT DOCUMENTS

| | | | |
|---|---|---|---|
| 2005/0269408 A1* | 12/2005 | Esterberg | G06K 7/0008 235/435 |
| 2010/0060424 A1 | 3/2010 | Wild et al. | |
| 2016/0146922 A1* | 5/2016 | Moshfeghi | H04W 4/029 455/456.6 |
| 2017/0234979 A1* | 8/2017 | Mathews | G01S 19/14 342/357.64 |
| 2018/0322376 A1* | 11/2018 | Henry | G06K 19/0723 |

OTHER PUBLICATIONS

Vinh-Hao Duong, "A Battery-Assisted Passive EPC Gen-2 RFID Sensor Tag IC with Efficient Battery Power Management and RF Energy Harvesting", IEEE Trans, on Industrial Electronics, vol. 63, No. 11, Nov. 2016.

T. Thayaparan and C. Wemik, "Noise Radar Technology Basics", Defence R&D Canada—Ottawa Technical Memorandum DRDC Ottawa TM 2006-266 Canada.

Ya'nan Duan, " Research progress of noise radar technology", 2011 3rd International Asia-Pacific Conference on Synthetic Aperture Radar (APSAR).

Jae-Young Jung, An UHF RFID Tag with Long Read Range, Article, Oct. 1, 2009, 1113-1116 Proceedings of the 39th European Microwave Conference, Changnam National University, Daekon, Korea.

\* cited by examiner

ASSET LOCATION USING BACKSCATTER COMMUNICATION WITH LOW PROBABILITY OF INTERCEPT AND DETECTION

FIELD OF DISCLOSURE

The present disclosure relates to asset location, and more particularly, to asset location using backscatter communication with a low probability of intercept and detection.

BACKGROUND

There are many applications in which it would be useful to have the capability to identify and locate assets from a distance. These assets can be people, animals, or objects, either in plain view or hidden from sight. Some examples include soldiers and emergency first responders who may be indoors or in an open field, valuable livestock, the black box from an aircraft, assets in motion such as tanks, trailers, or forklifts, to name just a few. Radio frequency identification (RFID) tags exist, which can be attached or otherwise coupled to assets and configured to respond to a transmitted request with an identification signal. Such tags, however, do not generally provide a mechanism for locating the asset, and they are insecure in that other listeners can eavesdrop on the response, and learn of the presence of the asset.

Figure 1:
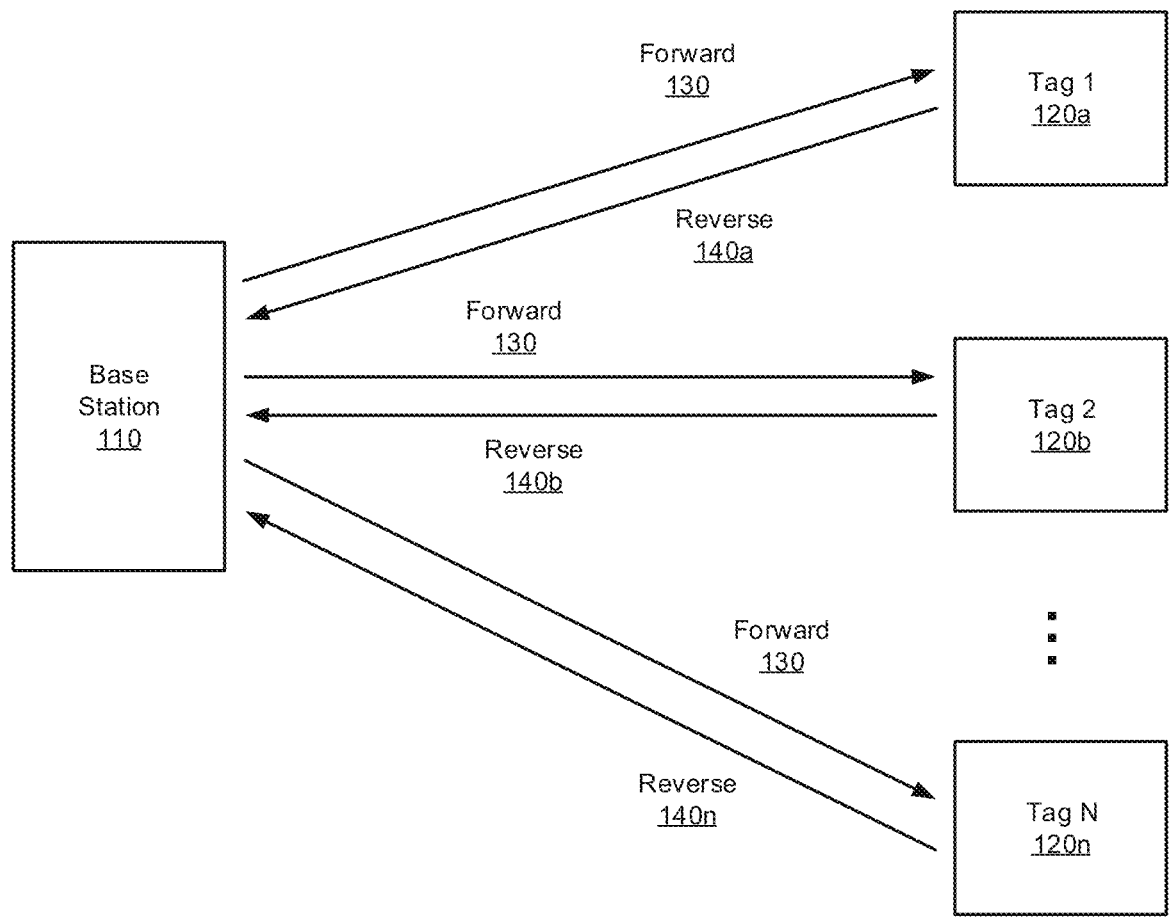
FIG. 1 illustrates deployment of an asset location system, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided for asset location using backscatter communication from an asset tag. Additionally, the techniques provide for low probability of intercept and detection (LPI/LPD) of the backscatter communication. As noted previously, there are many situations where it is useful to be able to identify and locate assets from a distance. It can also be important, in some scenarios, to deny this information to other parties that may be monitoring the radio frequency (RF) environment.

A system according to an example embodiment includes a base station configured to transmit a locating signal in a forward path from the base station to tag devices that are associated with assets of interest. As used herein, a base station is a radio receiver/transmitter that serves as the hub of a wireless network of one or more tags. The tag devices, or simply tags, may be attached to, or otherwise co-located with, the asset. The tag devices reflect that locating signal from the base station along a reverse path back to the base station as a modulated and frequency translated backscatter signal, for example through radar cross section modulation of the antenna, as will be explained in greater detail below. As used herein, the terms "forward path" and "reverse path" do not necessarily imply any directionality in an angular sense, but rather distinguish the origin and destination of the signal in each case. The base station can then determine the range to the asset by cross-correlating the transmitted signal with the reflected received signal. In particular, a location of a peak in that cross-correlation provides a time delay for the round trip signal travel time, from which the range to the asset can be derived based on the speed of light. The modulation induced by the tag provides a spectrum spreading effect that makes it difficult to detect the reflected signal without prior knowledge of the modulation code sequence, and thus provides a level of security to the asset location process. In some such embodiments, each tag may use a unique modulation code sequence from which the base station can identify the asset.

In some embodiments, the antennas of the base station and the tag may be substantially omnidirectional, and the disclosed techniques provide range from the base to the tag. In some other embodiments, direction finding (DF) techniques may be employed in conjunction with the range estimation to provide a location of the asset. The DF techniques may include, for example, beamforming, the use of directional antennas, or any other suitable technique in light of the present disclosure. For example, the receiving antenna beam may be steered to multiple directions, and the direction in which a range can be determined is selected as the direction to the asset. Once a direction vector and range are known, the object of interest can be located, as will be appreciated. In some embodiments, multiple base stations can be employed and the range from the asset to each of the base station can be used to estimate the location of the asset, for example, using triangulation or other suitable geolocating techniques, even if omnidirectional antennas are employed.

The disclosed techniques can be used in a wide variety of applications including, for example, locating personnel and equipment in military operations, monitoring the location of emergency responders for management and safety purposes, tracking the location of mobile assets such as vehicles (whether manned or unmanned), construction equipment, and mobile factory equipment (e.g., robots), locating valuable property, and monitoring the location of livestock or pets or protected/endangered species, although other applications will be apparent.

A system to implement the disclosed techniques can be hosted on a personal computer, workstation, laptop computer, tablet, touchpad, portable computer, handheld computer, cellular telephone, smartphone, or data communication device, to name just a few examples. In accordance with an embodiment, a methodology to implement these techniques includes generating a base code sequence, such as a pseudorandom noise (PN) sequence or chirp sequence, for transmission as a broadcast signal from the base station. The base code sequence is configured to provide an impulsive autocorrelation function. The method also includes receiving a signal, generated by a tag associated with the asset in response to the broadcast signal. The received signal comprises the broadcast signal modulated by a tag code sequence and shifted in frequency by a frequency offset. The tag code sequence is another PN sequence that is configured for spectrum spreading to provide LPI/LPD of the tag response signal by another party that is not privy to the tag code sequence. The method further includes translating the received signal by the frequency offset to generate a translated received signal and demodulating that translated received signal to remove the tag code sequence modulation. The method further includes cross-correlating the base code sequence with the demodulated received signal to generate a correlation signal, and determining a range to the asset based on a time delay associated with a peak of the correlation signal.

It will be appreciated that the techniques described herein may provide improved systems and methods for asset location, compared to systems that rely on received signal strength of a backscatter signal from a passive tag to estimate a distance to the asset. The use of received signal strength provides only a coarse range estimate and is highly vulnerable to error cause by multipath effects. Numerous embodiments and applications will be apparent in light of this disclosure.

System Architecture

FIG. 1 illustrates deployment of an asset location system 100, in accordance with certain embodiments of the present disclosure. The system 100 is shown to include a base station 110, and one or more tag devices 120a, 120b, . . . 120n, associated with assets to be located. At a high-level, the base station 110 is configured to transmit a locating signal along a forward path 130 to the tags 120, and the tags are configured to transmit a backscatter signal along the reverse path 140a, 140b, 140n, to the base station. The base station may then estimate the range to the tag based on the round-trip travel time along the forward and reverse paths of the signals. The round-trip travel time may be estimated by cross-correlating the transmitted and received signals to determine a time delay offset in the peak of the correlation, as will be explained in greater detail below. In some embodiments, two or more base stations may be deployed, and the estimated range to assets provided by each base station may be combined to generate an estimated location of the asset, for example, using triangulation or other suitable techniques in light of the present disclosure.

Figure 2:
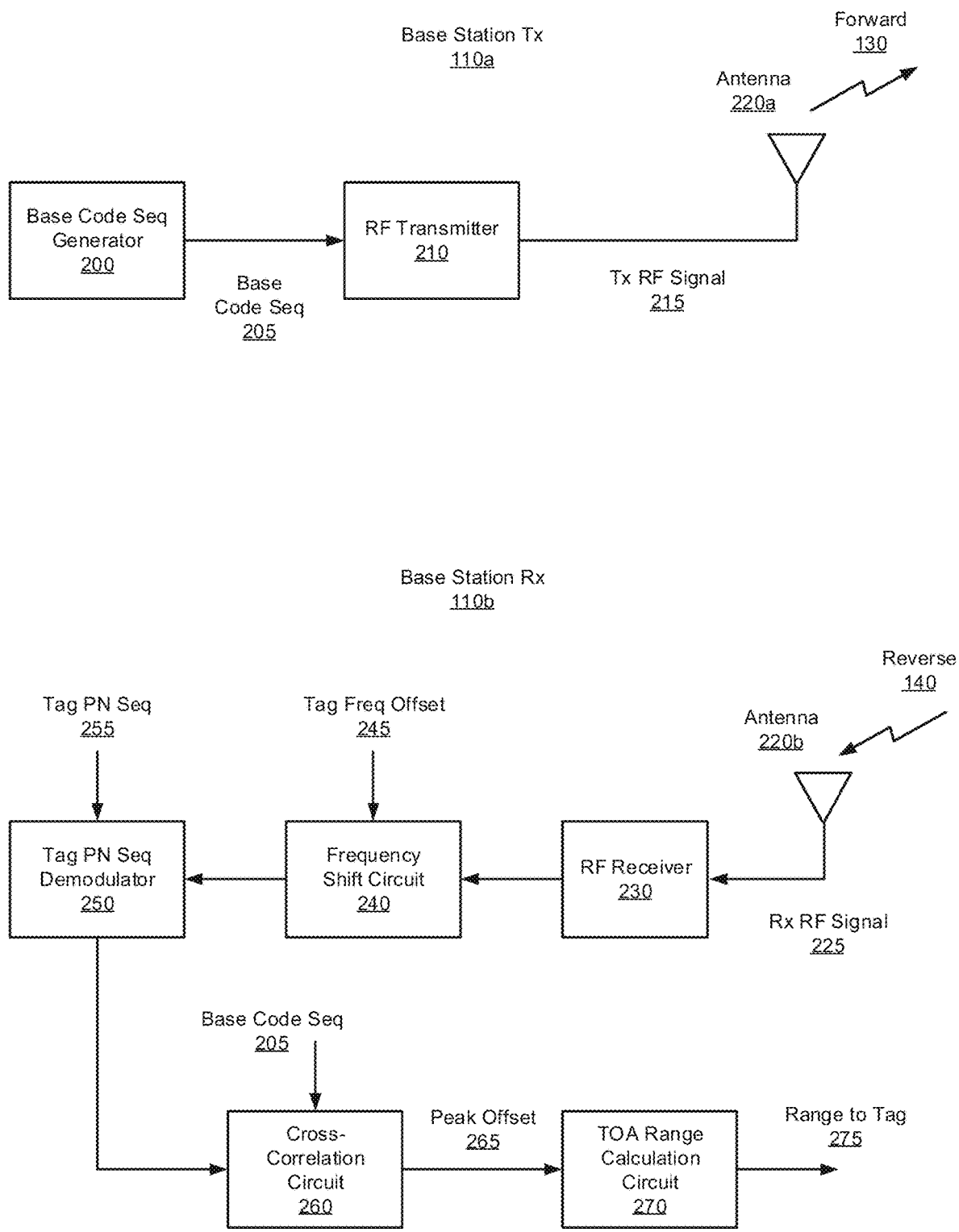
FIG. 2 is a block diagram of base station transmitter and receiver of the asset location system, configured in accordance with certain embodiments of the present disclosure.

FIG. 2 is a block diagram of base station transmitter 110a and the base station receiver 110b of the asset location system 100, configured in accordance with certain embodiments of the present disclosure. The base station transmitter 110a is shown to include a base code sequence generator 200, an RF transmitter 210, and an antenna 220a.

The base code sequence generator 200 is configured to generate a code sequence that in one example has impulsive autocorrelation properties, since a sharper impulse or spike in the autocorrelation improves the time delay estimation as described below. In some embodiments, the code sequence may be a digitally generated PN sequence or a chirp sequence, as these types of signals exhibit the desired autocorrelation properties.

In some embodiments, the code sequence may be generated by analog circuits (e.g., a noise diode) and a replica of the noise signal may then be used in the subsequent cross-correlation operation. The replica may be generated by digitizing and storing the analog noise signal or by maintaining a delayed version of the analog noise signal for use in an analog cross-correlation circuit.

The code sequence is referred to herein as the base code sequence 205 to distinguish it from the tag code sequence as described below, since it is generated for use as the forward path locating signal 130 to be transmitted by the base station, and to distinguish it from the tag code sequence as described below.

The RF transmitter 210 is configured to generate an RF transmit signal 215 from the base code sequence 205, for broadcast as the locating signal through antenna 220a along the forward path 130 (i.e., from the base station 110 to the tag 120).

The base station receiver 110b is shown to include an antenna 220b, an RF receiver 230, a frequency shift circuit 240, a tag PN sequence demodulator 250, a cross-correlation circuit 260, and a time of arrival (TOA) range calculation circuit 270.

The RF receiver 230 is configured to receive an RF backscatter signal 225 through antenna 220b. The RF backscatter signal 225 travels along the reverse path 140 (i.e., from the tag 120 to the base station 110). In some embodiments, the same antenna may be used for transmitting antenna 220a and receiving antenna 220b.

The operation of the asset tag 120 and the detailed characteristics of the RF backscatter signal 225 will be discussed in greater detail below in connection with FIGS. 3 and 4, but at a high level, the RF backscatter signal 225 is a modified reflection of the RF transmit signal 215 from the tag 120. The modification, induced by the tag, comprises a frequency translation (by a tag frequency offset 245) and an additional layer of modulation (by a tag PN sequence 255). The tag PN sequence is configured to provide the LPI/LPD features of the system, as described below.

The frequency shift circuit 240 is configured to frequency translate the received signal by the tag frequency offset 245 to remove that frequency offset and generate a translated received signal. The tag PN sequence demodulator 250 is configured to demodulate the translated received signal to remove the tag PN sequence 255 to generate a demodulated received signal. Although the frequency shift is shown to be performed before the demodulation, in some embodiments the order may be reversed.

The cross-correlation circuit 260 is configured to cross correlate the demodulated received signal with the base code sequence 205. The resulting correlated signal will have an impulse or spike with a peak located at an offset 265 that is proportional to the roundtrip travel time of the signal between the base station and the asset tag.

The TOA range calculation circuit 270 is configured to determine the range or distance 275 from the base station to the asset tag. In some embodiments, the range (R) may be calculated as:

$$R = \text{offset} * c/2$$

where the offset is the peak offset 265 in samples, converted to time (e.g., based on the sampling rate of the base code sequence 205), and c is the speed of light. The range is thus estimated based on the relative time of arrival of the backscatter signal as represented by the offset. In some embodiments, if multiple peaks are detected in the cross correlation, the earliest peak may be chosen as representing a direct path and thus mitigating problems resulting from multipath effects.

Figure 3:
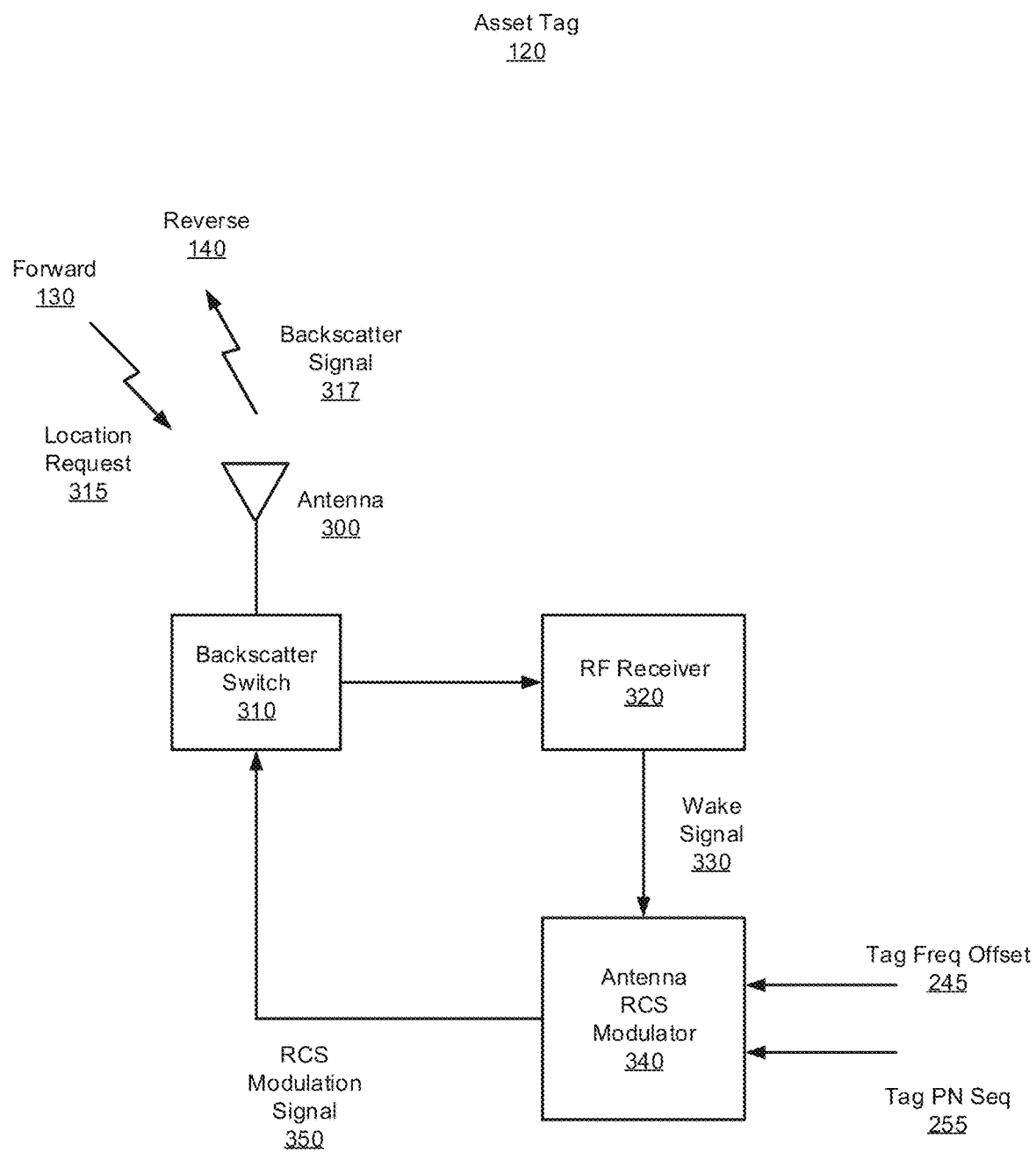
FIG. 3 is a block diagram of an asset tag of the asset location system, configured in accordance with certain embodiments of the present disclosure.

FIG. 3 is a block diagram of an asset tag 120 of the asset location system 100, configured in accordance with certain embodiments of the present disclosure. The asset tag 120 is shown to include an antenna 300, a backscatter switch 310, an RF receiver 320, and an antenna radar cross section (RCS) modulator 340.

The antenna 300 is configured to receive an asset location request signal 315 (i.e., the locating signal broadcast from the base station 110 along the forward path 130) and to transmit or reflect a backscatter signal 317 along the reverse path 140, to be received by the base station 110.

The RF receiver 320 is configured to generate a wake signal 330 in response to detection of the asset location request signal 315. The wake signal may then activate the antenna RCS modulator circuit 340 to wake it from a sleep state or low power state to conserve the battery power of the asset tag when not in use.

The antenna RCS modulator 340 is configured to generate an RCS modulation signal 350 based on a frequency offset value 245 and a tag code sequence 255. In some embodiments, the tag code sequence 255 is a PN sequence configured for spectrum spreading to decrease the probability of interception or detection of the backscatter signal (i.e., provide improved LPI/LPD performance). In some embodiments, the RCS modulation signal 350 is a phase shift keying modulation signal. In some embodiments, the frequency offset value 245 and the tag code sequence 255 are pre-assigned to the asset location tag as an identifier of the asset, and these values are also known to the base station.

The backscatter switch 310 is configured to vary the RCS of the antenna 300, based on the RCS modulation signal 350, to modulate the backscatter signal 317. For example, when the switch is closed, two sections or portions of the antenna 300 may be electrically coupled to increase the length or surface area of the antenna and thus increase the radar cross section of the antenna. Similarly, when the switch is opened, the two sections of the antenna may be electrically decoupled (thus isolating one of the sections) to decrease the length or surface area of the antenna and thus decrease the radar cross section of the antenna. In some embodiments, the backscatter switch may be implemented as an open/short switch at the tag antenna terminal. This variation of the RCS over time results in a modulation of the backscatter signal 317 by the antenna, which is transmitted, or reflected, back to the base station. In some embodiments, other suitable techniques may be used to vary the RCS of the antenna, in light of the present disclosure.

In some embodiments, the tag code sequence generation and RCS modulation may be disabled, for example to provide a less complex system. In these cases, the LPI/LPD features will be eliminated, as will the capability to handle and identify multiple tags simultaneously, leaving only the location capability.

Figure 4:
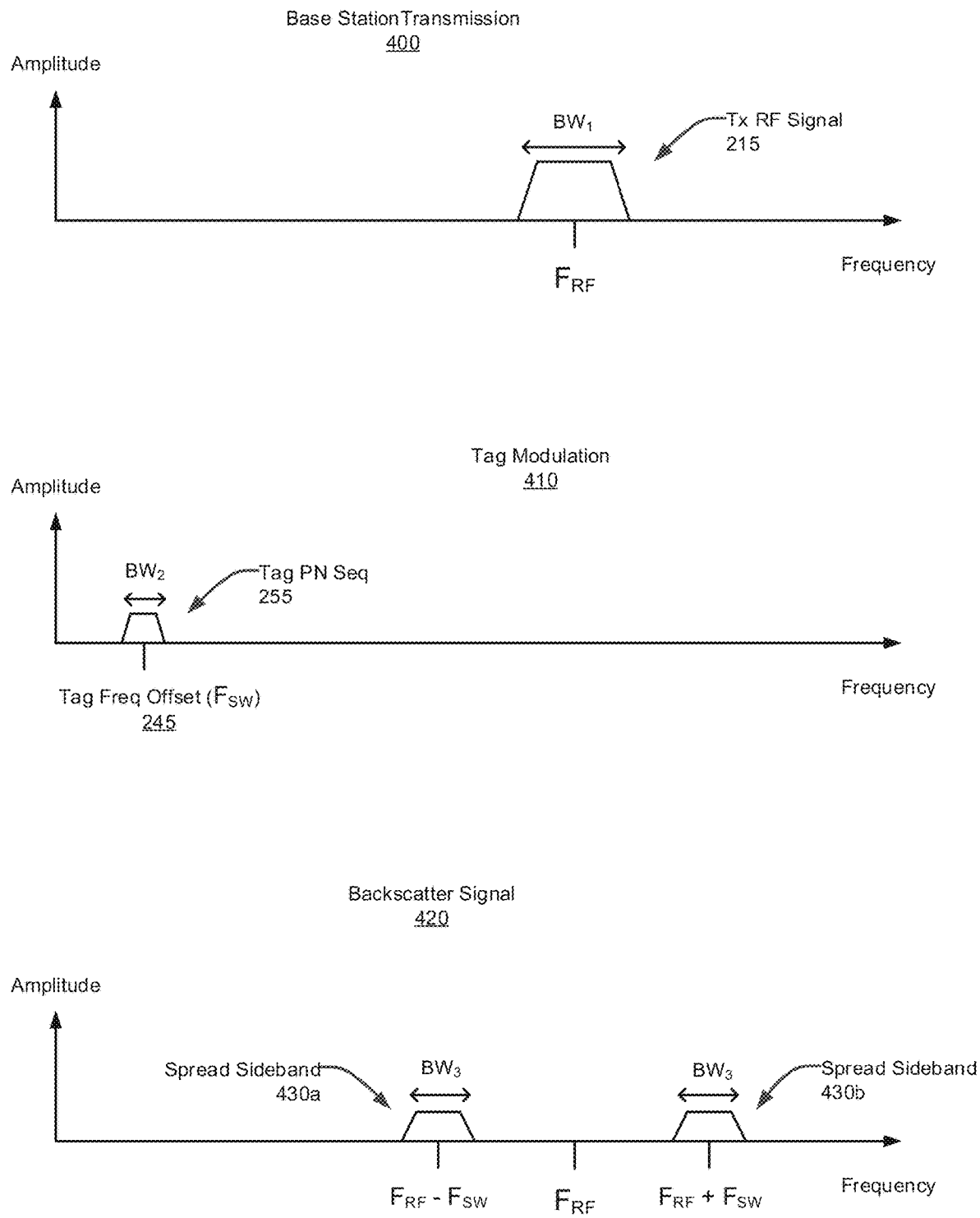
FIG. 4 illustrates frequency spectra of base station transmission, tag modulation, and backscatter signal, in accordance with certain embodiments of the present disclosure.

FIG. 4 illustrates frequency spectra of the base station transmission, the tag modulation, and the backscatter signal, in accordance with certain embodiments of the present disclosure. Plot 400 illustrates the frequency spectrum of the transmit RF signal 215 from the base station. It is centered around the transmit RF frequency $F_{RF}$ and occupies a bandwidth $BW_1$ that is associated with the bandwidth of the base code sequence 205.

Plot 410 illustrates the frequency spectrum of the tag RCS modulation signal 350. It is centered around the tag frequency offset 245, denoted $F_{SW}$ in the figure, and has a bandwidth $BW_2$ associated with the tag PN sequence 255.

Plot 420 illustrates the frequency spectrum of the backscatter signal 317. As shown, there is a lower sideband 430a and an upper sideband 430b. The lower sideband is centered at $F_{RF}-F_{SW}$, and the upper sideband is centered at $F_{RF}+F_{SW}$. The sideband spectra are spread to bandwidth $BW_3$ which is based on $BW_1$ and $BW_2$.

One purpose for the tag frequency offset $F_{SW}$ is to move the sidebands away from the frequency region of the transmit RF signal 215 so that the base station receiver can tune to the sideband to reduce interference from the transmit RF signal and avoid saturating the receiver front end. In some embodiments, the base station receiver may be tuned to detect either the upper or lower sideband. In some embodiments, the base station receiver may be tuned to detect and employ both sidebands, for example to implement diversity techniques to reduce multipath errors and/or to avoid signal jamming that may be present in one of the sidebands. Another purpose for the tag frequency offset $F_{SW}$, as will be described below, is to aid in identifying the asset from among a number of assets. In some embodiments, the backscatter switch 310 may be operated at switching speeds in the tens of Megahertz range.

The operation of the asset location system 100 may be described mathematically. According to an embodiment, the system may be described as follows, where the transmit RF signal 215, comprising the base code sequence, is represented as n(t). The delayed transmitted signal received at the tag is represented as n(t+td), where $t_d$ is the time taken for the signal to travel from the base station to the tag (e.g., at the speed of light c). The backscatter signal from the tag may thus be represented as:

$$n(t+td) \cdot e^{-j(2\pi \cdot F_{SW} \cdot t + \frac{\pi}{2} \cdot pn(t))} = n(t+td) \cdot e^{-j \cdot 2\pi \cdot f_{SW} \cdot t} \cdot e^{-j \cdot \frac{\pi}{2} \cdot pn(t)}$$

where $F_{SW}$ is the tag frequency offset 245 and pn(t) is the tag code sequence 255. The backscatter sign received at the base station is:

$$n(t+2 \cdot td) \cdot e^{-j \cdot 2\pi \cdot f_{SW} \cdot t} \cdot e^{-j \cdot \frac{\pi}{2} \cdot pn(t)}$$

Frequency translation and demodulation performed at the base station results in a received signal of n(t+2·td) which, when cross correlated with n(t), the base code sequence 205, results in a peak at the offset of $2t_d$.

Figure 5:
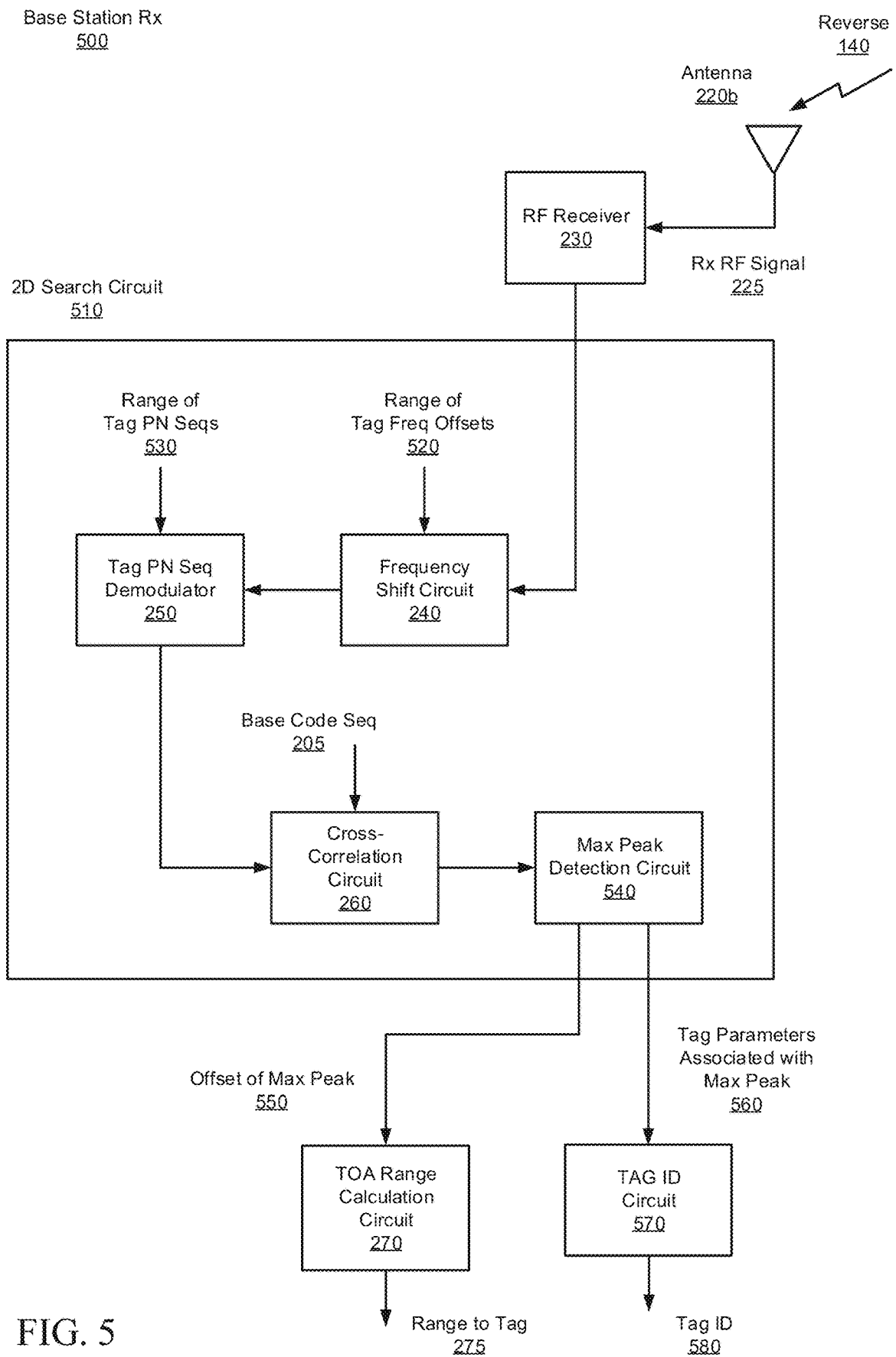
FIG. 5 is a block diagram of a base station receiver of the asset location system, configured in accordance with certain other embodiments of the present disclosure.

FIG. 5 is a block diagram of a base station receiver 500 of the asset location system 100, configured in accordance with certain other embodiments of the present disclosure. The base station receiver 500 is shown to include antenna 220b, RF receiver 230, a 2-dimensional search circuit 510, a TOA range calculation circuit 270, and a tag identification circuit 570. The 2-dimensional search circuit 510 is shown to include frequency shift circuit 240, tag PN sequence demodulator 250, cross-correlation circuit 260, and a maximum peak detection circuit 540.

In these embodiments, the base station receiver 500 is configured to identify an asset, from among some number of different assets, in addition to determining the range to the asset. Each asset tag is assigned a unique orthogonal tag PN sequence 255 and/or tag frequency offset 245, which may serve as the identifier for the asset. The assignments may be pre-arranged in any convenient manner, for example during manufacture or initial programming of the tag, or through an additional communication operation between the base station and the tag.

The 2-dimensional search circuit 510 is configured to search through a range of tag frequency offsets (e.g., as the first search dimension) and a range of tag PN sequences (e.g., as the second search dimension). In some embodiments, the search ranges may be limited to a list of known tag frequency offsets 520 and tag PN sequences 530. For each point in the 2D search (i.e., each combination of tag PN sequence and tag frequency offset), a cross correlation is generated, as described previously (e.g., using frequency shift circuit 240, tag PN sequence demodulator 250, and cross-correlation circuit 260).

The maximum peak detection circuit 540 is configured to search through each of the resulting cross correlation and select the cross correlation with the maximum impulsive peak. This selected correlation corresponds to the point in the 2D search that employed the tag PN sequence and tag frequency offset that are most likely associated with the tag.

The TOA range calculation circuit 270 is configured to determine the range 275 from the base station to the asset tag, as previously described. In this embodiment, however, the range calculation is based on the offset of the maximum peak 550, which is to say the peak of the selected correlation that resulted in the maximum impulsive peak.

The tag ID circuit 570 is configured to identify the asset based on tag parameters 560 associated with the maximum peak. The tag parameters include the tag PN sequence and tag frequency offset, associated with the selected correlation and which are most likely associated with the tag. In some embodiments, for example, these parameters may be used as an index into a table that lists the assets of interest and from which the tag identification 580 may be generated.

Methodology

Figure 6:
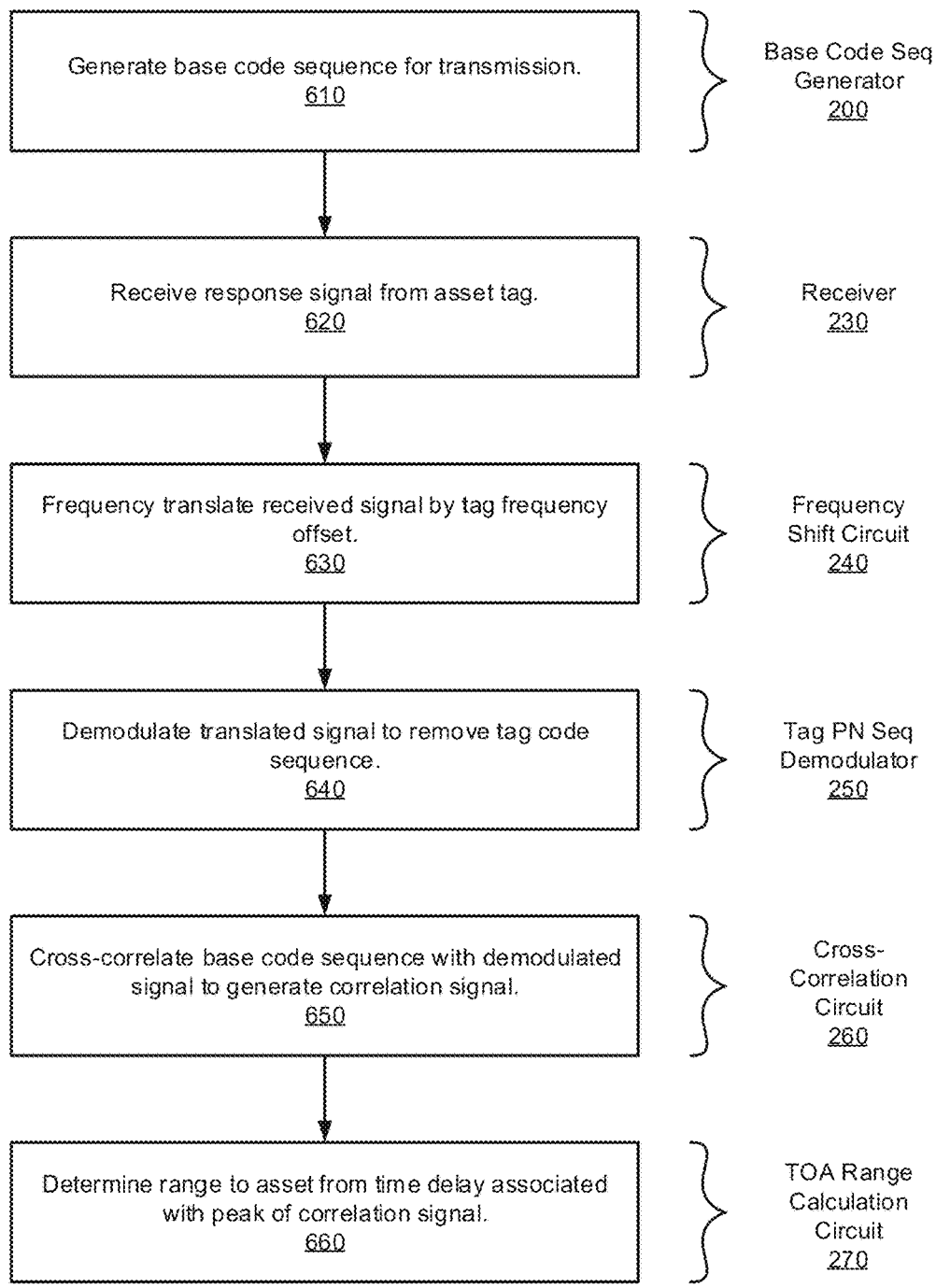
FIG. 6 is a flowchart illustrating a methodology for operation of the base station of the asset location system, in accordance with an embodiment of the present disclosure.
Figure 7:
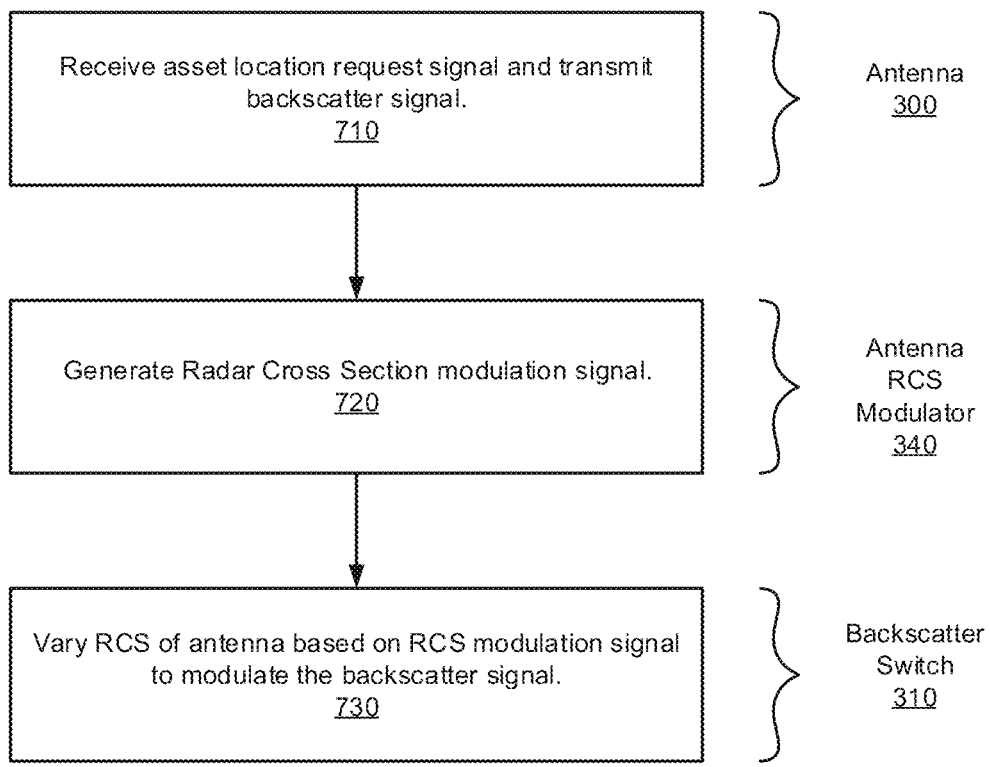
FIG. 7 is a flowchart illustrating a methodology for operation of the asset tag of the asset location system, in accordance with another embodiment of the present disclosure.

FIGS. 6 and 7 are flowcharts illustrating methodologies for asset location, in accordance with an embodiment of the present disclosure. As can be seen, example methods 600 and 700 include a number of phases and sub-processes, the sequence of which may vary from one embodiment to another. However, when considered in aggregate, these phases and sub-processes form a process for asset location using backscatter communication, in accordance with certain of the embodiments disclosed herein. These embodiments can be implemented, for example using the system architecture illustrated in FIGS. 1-3, and 5, as described above. However other system architectures can be used in other embodiments, as will be apparent in light of this disclosure. To this end, the correlation of the various functions shown in FIGS. 6 and 7 to the specific components illustrated in FIGS. 1-3, and 5, is not intended to imply any structural and/or use limitations. Rather other embodiments may include, for example, varying degrees of integration wherein multiple functionalities are effectively performed by one system. Numerous variations and alternative configurations will be apparent in light of this disclosure.

FIG. 6 illustrates a methodology for operation of the base station of the asset location system. In one embodiment, method 600 commences, at operation 610, by generating a base code sequence for transmission as a signal for broadcast from the base station. In some embodiments, the base code sequence is a PN sequence or a chirp sequence that is configured to provide an impulsive autocorrelation function.

Next, at operation 620, a signal is received from the tag associated with the asset. The signal is generated by the tag in response to the broadcast signal and comprises the broadcast signal modulated by a tag code sequence and shifted in frequency by a frequency offset. In some embodiments, the tag code sequence is another PN sequence that is configured for spectrum spreading to decrease the probability of intercept or detection of the tag response signal by another party that is not privy to the tag code sequence.

At operation 630, the received signal is translated (e.g., frequency shifted) by the frequency offset (which is known to the base station) to generate a translated received signal. At operation 640, the translated received signal is demodulated to remove the tag code sequence modulation (which is also known to the base station) to generate a demodulated received signal.

At operation 650, the base code sequence is cross-correlated with the demodulated received signal to generate a correlation signal. At operation 660, a range to the asset is determined based on a time delay associated with a peak of the correlation signal. The temporal offset of the peak in the correlation signal is associated with the round-trip distance between the base station on the asset tag.

Of course, in some embodiments, additional operations may be performed, as previously described in connection with the system. These additional operations may include, for example, repeating the process for one or more additional iterations and averaging the determined ranges to reduce error. In some embodiments, two or more assets and associated tags may be located within transmission range of the base station, and each tag may have a preassigned tag code sequence and frequency offset, which are known to the base station and can be used to distinguish, identify, and locate each asset.

FIG. 7 illustrates a methodology for operation of the asset tag of the asset location system. In one embodiment, method 700 commences, at operation 710, by receiving an asset location request signal from a base station and, in response, transmitting a backscatter signal. The reception and transmission may occur through an antenna of the tag device.

Next, at operation 720, an RCS modulation signal is generated based on a frequency offset value and a tag code sequence of the tag. In some embodiments, these parameters (frequency offset and tag code sequence) may be uniquely associated with, or assigned to, the tag device to permit identification of the tag.

At operation 730, the RCS of the antenna is varied, based on the RCS modulation signal, such that the backscatter signal is modulated. In some embodiments, the RCS variation may be implemented by an antenna backscatter switch controlled by the RCS modulation signal.

Of course, in some embodiments, additional operations may be performed, as previously described in connection with the system. These additional operations may include, for example, generating a wake signal in response to detection of the asset location request signal, the wake signal to activate the antenna RCS modulator circuit. In some embodiments, the tag code sequence is a PN sequence that is configured for spectrum spreading to decrease the probability of intercept or detection of the backscatter signal (e.g., the tag response signal) by a party, other than the base station, which is not privy to the tag code sequence.

Example System

Figure 8:
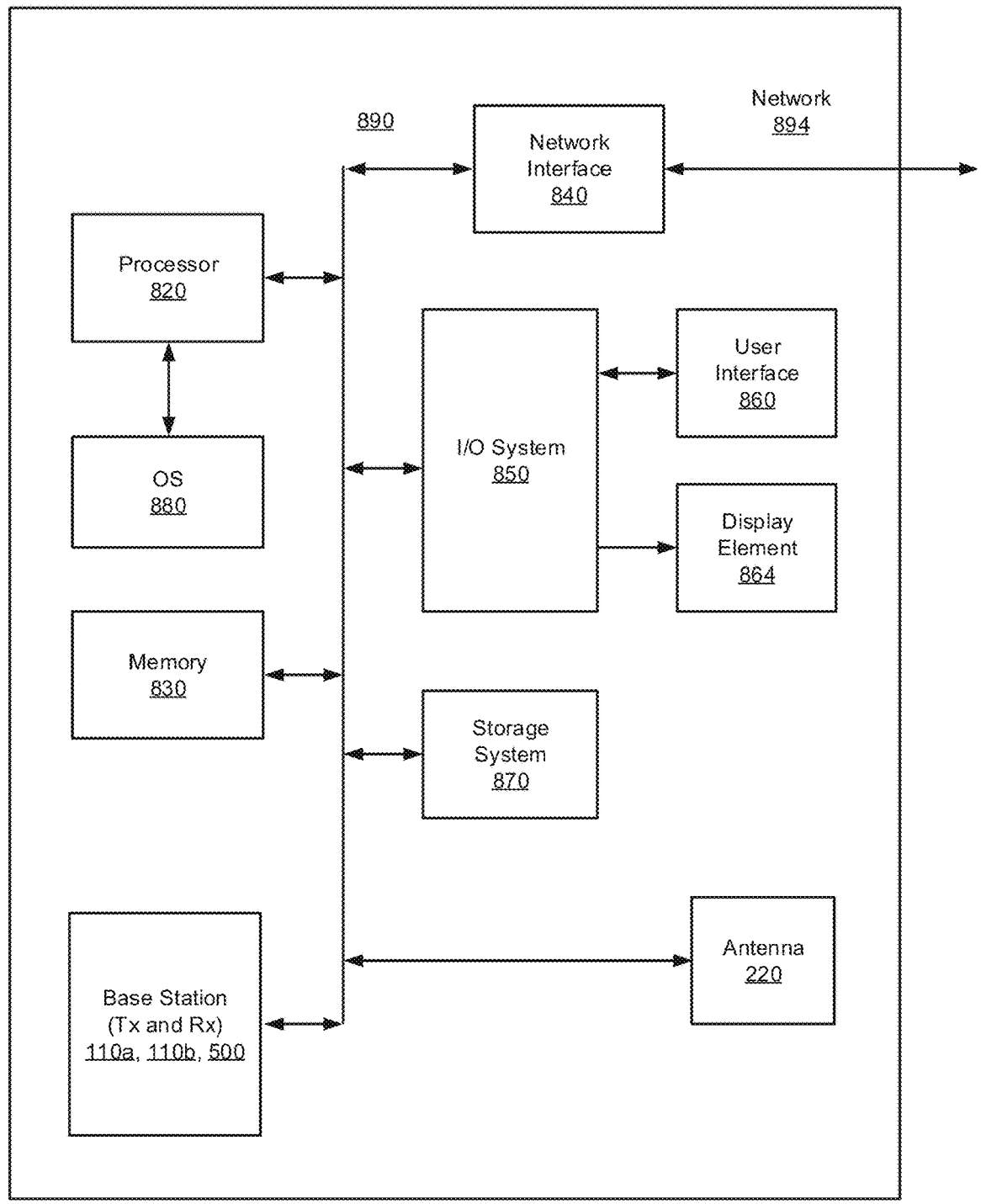
FIG. 8 is a block diagram schematically illustrating a base station processing platform configured to perform asset location, in accordance with an embodiment of the present disclosure.

FIG. 8 is a block diagram schematically illustrating a base station processing platform 800 configured to perform asset location, in accordance with an embodiment of the present disclosure. In some embodiments, platform 800, or portions thereof, may be hosted on, or otherwise be incorporated into the electronic systems of a data communication device, personal computer, workstation, laptop computer, tablet, touchpad, portable computer, handheld computer, cellular telephone, smartphone, messaging device, embedded system, or any other suitable platform. Any combination of different devices may be used in certain embodiments.

In some embodiments, platform 800 may comprise any combination of a processor 820, a memory 830, a base station transmitter and receiver 110a, 110b, 500, a network interface 840, an input/output (I/O) system 850, a user interface 860, a display element 864, a storage system 870, and an antenna 220. As can be further seen, a bus and/or interconnect 890 is also provided to allow for communication between the various components listed above and/or other components not shown. Platform 800 can be coupled to a network 894 through network interface 840 to allow for communications with other computing devices, platforms, devices to be controlled, or other resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with platform 800. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random-access memory (RAM). In some embodiments, the memory 830 may include various layers of memory hierarchy and/or memory caches. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 800, and therefore may also be implemented using any suitable existing or subsequently-developed platform.

Network interface circuit 840 can be any appropriate network chip or chipset which allows for wired and/or wireless connection between other components of platform 800 and/or network 894, thereby enabling platform 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of platform 800. I/O devices may include, but not be limited to, user interface 860 and display element 864. User interface 860 may include devices (not shown) such as a touchpad, keyboard, and mouse, etc., for example, to allow the user to control the system. Display element 864 may be configured to display a map that includes asset range, location, and/or identification information. I/O system 850 may include a graphics subsystem configured to perform processing of images for rendering on the display element 864. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 800.

It will be appreciated that in some embodiments, the various components of platform 800 may be combined or integrated in a system-on-a-chip (SoC) architecture. In some embodiments, the components may be hardware components, firmware components, software components or any suitable combination of hardware, firmware or software.

Base station transmit and receive components 110a, 110b, and 500 are configured to perform asset location by transmitting a signal to an asset tag and processing a backscatter return signal from the tag, to determine range to the asset, as described previously. Base station transmit and receive components 110a, 110b, and 500 may include any or all of the circuits/components illustrated in FIGS. 2, 3, and 5, as described above. These components can be implemented or otherwise used in conjunction with a variety of suitable software and/or hardware that is coupled to or that otherwise forms a part of platform 800. These components can additionally or alternatively be implemented or otherwise used in conjunction with user I/O devices that are capable of providing information to, and receiving information and commands from, a user.

In some embodiments, these circuits may be installed local to platform 800, as shown in the example embodiment of FIG. 8. Alternatively, platform 800 can be implemented in a client-server arrangement wherein at least some functionality associated with these circuits is provided to platform 800 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 894 or remotely coupled to network 894 by one or more other networks and/or communication channels. In some cases, access to resources on a given network or computing system may require credentials such as usernames, passwords, and/or compliance with any other suitable security mechanism.

In various embodiments, platform 800 may be implemented as a wireless system, a wired system, or a combination of both. When implemented as a wireless system, platform 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a system for asset location, the system comprising: a transmitter configured to broadcast a signal comprising a base code sequence; a receiver configured to receive a signal, generated by a tag associated with an asset in response to the broadcast signal, the received signal comprising the broadcast signal modulated by a tag code sequence and shifted in frequency by a frequency offset; a frequency shift circuit configured to translate the received signal by the frequency offset to generate a translated received signal; a demodulation circuit configured to demodulate the translated received signal to remove the tag code sequence modulation to generate a demodulated received signal; a cross-correlation circuit configured to cross-correlate the base code sequence with the demodulated received signal to generate a correlation signal; and a range calculation circuit configured to determine a range to the asset based on a time delay associated with a peak of the correlation signal.

In some cases, the base code sequence is a pseudo-random noise (PN) sequence or a chirp sequence and the base code sequence is configured to provide an impulsive autocorrelation function. In some cases, the tag code sequence is a PN sequence configured for spectrum spreading. In some cases, the asset is a first asset, the tag code sequence is a first tag code sequence associated with the first asset, the frequency offset is a first frequency offset associated with the first asset, the correlation signal is a first correlation signal, and the system is further configured to generate a second correlation signal based on a second tag code sequence associated with a second asset and a second frequency offset associated with the second asset. In some such cases, the system further comprises: a maximum peak detection circuit to select a largest of the peak of the first correlation signal and a peak of the second correlation signal; and a tag identification circuit configured to identify the tag associated with the received signal based on the selected largest peak. In some cases, each of the transmitter, receiver, frequency shift circuit, demodulation circuit, cross-correlation circuit, and range calculation circuit are part of a first base station, the system further comprising two or more additional base stations, so as to provide two or more additional ranges to the asset, and wherein the system is further configured to generate an estimated location of the asset based on the range and the two or more additional ranges. In some cases, the tag code sequence modulation is phase shift keying modulation.

Another example embodiment of the present disclosure provides a computer program product including one or more machine-readable mediums encoded with instructions that when executed by one or more processors cause a process to be carried out for asset location, the process comprising: receiving a signal, generated by a tag associated with an asset in response to a broadcast signal, the broadcast signal including a base code sequence, the received signal comprising the broadcast signal modulated by a tag code sequence and shifted in frequency by a frequency offset; translating the received signal by the frequency offset to generate a translated received signal; demodulating the translated received signal to remove the tag code sequence modulation to generate a demodulated received signal; cross-correlating the base code sequence with the demodulated received signal to generate a correlation signal; and determining a range to the asset based on a time delay associated with a peak of the correlation signal.

In some cases, the process further comprises generating the base code sequence for transmission as the broadcast signal, wherein the base code sequence is a pseudo-random noise (PN) sequence or a chirp sequence and the base code sequence is configured to provide an impulsive autocorrelation function. In some cases, the tag code sequence is a PN sequence configured for spectrum spreading to decrease probability of detection of the received signal. In some cases, the asset is a first asset, the tag code sequence is a first tag code sequence associated with the first asset, the frequency offset is a first frequency offset associated with the first asset, the correlation signal is a first correlation signal, and the process further comprises generating a second correlation signal based on a second tag code sequence associated with a second asset and a second frequency offset associated with the second asset. In some such cases, the process further comprises: selecting a largest of the peak of the first correlation signal and a peak of the second correlation signal; and identifying the tag associated with the received signal based on the selected largest peak. In some cases, the process further comprises: employing a direction finding process to the received signal to determine a direction to the tag; and identifying a location of the tag based on the range and the direction. In some cases, the tag code sequence modulation is phase shift keying modulation. In some cases, the process further comprises repeating the process for one or more additional iterations and averaging the determined ranges to reduce error.

One example embodiment of the present disclosure provides an asset location tag device comprising: an antenna configured to receive an asset location request signal and to transmit a backscatter signal; an antenna radar cross section (RCS) modulator circuit configured to generate an RCS modulation signal based on a frequency offset value and a tag code sequence; and an antenna backscatter switch configured to vary the RCS of the antenna, based on the RCS modulation signal, to modulate the backscatter signal. In some cases, the tag code sequence is a pseudo-random noise (PN) sequence configured for spectrum spreading to decrease probability of detection of the backscatter signal. In some cases, the RCS modulation signal is a phase shift keying modulation signal. In some cases, the frequency offset value and the tag code sequence are assigned to the asset location tag as an identifier of the asset. In some cases, the device further comprises a receiver circuit coupled to the antenna and configured to generate a wake signal in response to detection of the asset location request signal, the wake signal to activate the antenna RCS modulator circuit.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An asset location system comprising:
    a transmitter configured to broadcast a signal comprising a base code sequence;
    a receiver configured to receive a signal, generated by a tag associated with an asset in response to the broadcast signal, the received signal comprising the broadcast signal modulated by a tag code sequence and shifted in frequency by a frequency offset;
    a frequency shift circuit configured to translate the received signal by the frequency offset to generate a translated received signal;
    a demodulation circuit configured to demodulate the translated received signal to remove the tag code sequence modulation to generate a demodulated received signal;
    a cross-correlation circuit configured to cross-correlate the base code sequence with the demodulated received signal to generate a correlation signal; and
    a range calculation circuit configured to determine a range to the asset based on a time delay associated with a peak of the correlation signal.

2. The system of claim 1, wherein the base code sequence is a pseudo-random noise (PN) sequence or a chirp sequence and the base code sequence is configured to provide an impulsive autocorrelation function.

3. The system of claim 1, wherein the tag code sequence is a PN sequence configured for spectrum spreading.

4. The system of claim 1, wherein the asset is a first asset, the tag code sequence is a first tag code sequence associated with the first asset, the frequency offset is a first frequency offset associated with the first asset, the correlation signal is a first correlation signal, and the system is further configured to generate a second correlation signal based on a second tag code sequence associated with a second asset and a second frequency offset associated with the second asset.

5. The system of claim 4, further comprising:
    a maximum peak detection circuit to select a largest of the peak of the first correlation signal and a peak of the second correlation signal; and
    a tag identification circuit configured to identify the tag associated with the received signal based on the selected largest peak.

6. The system of claim 1, wherein each of the transmitter, receiver, frequency shift circuit, demodulation circuit, cross-correlation circuit, and range calculation circuit are part of a first base station, the system further comprising two or more additional base stations, so as to provide two or more additional ranges to the asset, and wherein the system is further configured to generate an estimated location of the asset based on the range and the two or more additional ranges.

7. The system of claim 1, wherein the tag code sequence modulation is phase shift keying modulation.

8. A computer program product including one or more machine-readable mediums encoded with instructions that when executed by one or more processors cause a process to be carried out for asset location, the process comprising:
   receiving a signal, generated by a tag associated with an asset in response to a broadcast signal, the broadcast signal including a base code sequence, the received signal comprising the broadcast signal modulated by a tag code sequence and shifted in frequency by a frequency offset;
   translating the received signal by the frequency offset to generate a translated received signal;
   demodulating the translated received signal to remove the tag code sequence modulation to generate a demodulated received signal;
   cross-correlating the base code sequence with the demodulated received signal to generate a correlation signal; and
   determining a range to the asset based on a time delay associated with a peak of the correlation signal.

9. The computer program product of claim 8, the process further comprises generating the base code sequence for transmission as the broadcast signal, wherein the base code sequence is a pseudo-random noise (PN) sequence or a chirp sequence and the base code sequence is configured to provide an impulsive autocorrelation function.

10. The computer program product of claim 8, wherein the tag code sequence is a PN sequence configured for spectrum spreading to decrease probability of detection of the received signal.

11. The computer program product of claim 8, wherein the asset is a first asset, the tag code sequence is a first tag code sequence associated with the first asset, the frequency offset is a first frequency offset associated with the first asset, the correlation signal is a first correlation signal, and the process further comprises generating a second correlation signal based on a second tag code sequence associated with a second asset and a second frequency offset associated with the second asset.

12. The computer program product of claim 11, wherein the process further comprises:
   selecting a largest of the peak of the first correlation signal and a peak of the second correlation signal; and
   identifying the tag associated with the received signal based on the selected largest peak.

13. The computer program product of claim 8, wherein the process further comprises:
   employing a direction finding process to the received signal to determine a direction to the tag; and
   identifying a location of the tag based on the range and the direction.

14. The computer program product of claim 8, wherein the tag code sequence modulation is phase shift keying modulation.

15. The computer program product of claim 8, wherein the process further comprises repeating the process for one or more additional iterations and averaging the determined ranges to reduce error.

* * * * *